United States Patent [19]

Yooda et al.

[11] Patent Number: 5,332,434

[45] Date of Patent: Jul. 26, 1994

[54] METHOD FOR ADJUSTING CONSISTENCY

[75] Inventors: Eiichi Yooda, Tokyo; Fumitaka Itoh, Saitama, both of Japan

[73] Assignee: Masahisa Terao, Tokyo, Japan

[21] Appl. No.: 935,103

[22] Filed: Aug. 27, 1992

[30] Foreign Application Priority Data

Nov. 27, 1991 [JP] Japan .................. 3-312153
Dec. 4, 1991 [JP] Japan .................. 3-320436

[51] Int. Cl.$^5$ .............................................. C04B 26/00
[52] U.S. Cl. ................................. 106/724; 106/730; 106/805; 106/823
[58] Field of Search .............. 106/691, 696, 719, 724, 106/726, 728, 729, 730, 822, 823, 805, 197.2, 739, 314

[56] References Cited

U.S. PATENT DOCUMENTS

| 3,692,728 | 9/1972 | Bonnel | 106/696 |
| 4,088,808 | 5/1978 | Cornwell | 106/696 |
| 4,473,406 | 9/1984 | Bradley et al. | 106/823 |

FOREIGN PATENT DOCUMENTS

| 1151678 | 8/1983 | Canada | 106/730 |
| 0134760 | 3/1979 | German Democratic Rep. | 106/728 |
| 0125257 | 10/1981 | Japan | 106/696 |
| 0141450 | 8/1984 | Japan | 106/730 |
| 0137859 | 7/1985 | Japan | 106/805 |
| 7018113 | 6/1972 | Netherlands | 106/805 |
| 2000490 | 1/1979 | United Kingdom | 106/724 |

Primary Examiner—Karl Group
Assistant Examiner—Paul Marcantoni
Attorney, Agent, or Firm—Longacre & White

[57] ABSTRACT

Disclosed herein is a method for adjusting the consistency of a concrete mix by adding a water-absorbing polymeric material or a thickening agent of carboxymethylcellulose to a fresh concrete mix.

2 Claims, No Drawings

METHOD FOR ADJUSTING CONSISTENCY

BACKGROUND OF THE INVENTION

1. Field of the Invention

The present invention relates to a method for adjusting the consistency of a fresh concrete mix at the site of concrete placement, and more particularly to a method for adjusting the plasticity and fluidity of a concrete mix which vary depending on the amount of water.

2. Description of the Prior Art

It is known well that the consistency of a concrete mix is one of the most important factors governing concrete placement. A stiff-consistency concrete mix having a low slump value involves difficulties in placement it requires much labor for compacting (which leads to low efficiency) and is liable to honeycombing. On the other hand, a soft-consistency concrete mix having a high slump value has improved workability but is liable to bleeding and reduced strength and durability (after hardening). A proper adjustment of consistency is very important particularly for concrete structures such as concrete barrier, round aqueduct, and bridge retaining wall which are built continuously by slip form construction, and also for concrete structures such as U-shaped or L-shaped canals which need watertightness. In the case of concrete barrier, a concrete mix having a low slump value gives rise to weak concrete due to an excessive void content; by contrast, a concrete mix having a high slump value easily deforms, with the upper surface sinking and the body expanding.

Usually concrete mixing is not performed at the site but is performed at a concrete plant, and ready-mixed concrete is brought into the site by agitator trucks. Under these circumstances, the adjustment of consistency is accomplished by adding admixtures such as cement, fly ash, and mineral powder, to ready-mixed concrete brought into the site. The amount of the admixtures for this purpose is established according to the mix design, trial mix, and slump test. The conventional method, however, has a disadvantage of requiring the admixtures in large quantities. This necessitates a large scale facility and much labor to handle the admixtures. Moreover, making adjustment intermittently as agitator trucks arrive at the site poses a problem associated with maintaining uniform quality, particularly in the case where a large quantity of concrete is to be placed. The present invention was completed to eliminate the above-mentioned disadvantages involved in the prior art technology.

SUMMARY OF THE INVENTION

It is an object of the present invention to provide a new method for adjusting the consistency of a concrete mix. To achieve the object of the invention, the present inventors paid their attention to the development of a new water absorbing polymer. It is known that natural fiber and polymer (such as paper and cotton cloth) and porous materials (such as synthetic cellular products and pumice stone) absorb water. These materials, however, can absorb and hold as much water as their weight, or several tens times at the highest. Moreover, they easily release the absorbed water under external pressure. This results in concrete having insufficient strength and hence jeopardizes the safety and durability of the structures.

A recently developed water absorbing polymeric material, which is composed of acrylic acid copolymer, vinyl alcohol copolymer, and sodium acrylate polymer, is capable of absorbing tens to hundreds times as much water as its weight. Its absorbing capacity for city water is nearly 1000 times its weight. In addition, it absorbs water rapidly and retains the absorbed water even when it receives external pressure. The absorbing capacity for city water decreases by one order of magnitude in the presence of calcium ions and decreases by another one order of magnitude in the presence of external pressure by gravel and sand. The amount of the water-absorbing polymer required for the adjustment of consistency is 2 kg per $m^3$ of ready-mixed concrete, assuming that about 20 kg of water per $m^3$ of concrete mix has to be absorbed for the reduction of a slump value from 8 cm to 3 cm.

The water-absorbing polymeric material is in the form of spherical or granular powder of micron size. Recently, it is also available in the form of short fiber or pellet for easy handling.

The gist of the present invention resides in a method for adjusting the consistency of a concrete mix at the site by adding the above-mentioned water-absorbing polymeric material to a fresh concrete mix. The method is applicable to a high slump concrete mix prepared at a concrete plant and brought into the site by a agitator truck. The concrete mix is incorporated with the water-absorbing polymeric material during its remixing and conveyance by a screw feeder. The resulting concrete mix has its consistency adjusted so that it is suitable for slip form construction and the like.

Moreover, in order to achieve the above-mentioned object, the present inventors paid their attention to a water-soluble thickening agent called CMC (carboxymethylcellulose), which finds use as an adhesive for fiber board and plywood and also as an ingredient for drilling mud. As is commonly known, this water-soluble thickening agent has the following features.

(1) It readily dissolves in cold water as well as hot water to give a viscous solution.
(2) Its solution does not change in viscosity with time.
(3) Its solution readily emulsifies a liquid or disperses a solid.
(4) Its solution exhibits adhesive properties.
(5) It does not dissolve in oil, grease, and organic solvents.
(6) It is harmless to the human body.
(7) It is uniform and consistent in quality.
(8) It is in the form of powder or granule which is easy to handle.

Utilizing these features of thickening agent, the present inventors succeeded in adjusting the consistency of a concrete mix at the site by adding CMC (as a thickening agent) to ready-mixed concrete before hardening. The method is applicable to a high slump concrete mix prepared at a concrete plant and brought into the site by a agitator truck. The concrete mix is incorporated with CMC (as a thickening agent in the form of powder or granule) during its remixing and conveyance by a screw feeder. The resulting concrete mix has its consistency adjusted so that it is suitable for slip form construction and the like.

As mentioned above, the method of the present invention consists of incorporating a concrete mix with a water-absorbing polymeric material having a high water-absorbing capacity, or CMC which readily dissolves in water to form a viscous solution which exhibits adhesive properties, thereby adjusting the consistency of a concrete mix. The method of the present invention obviates the necessity of using a large amount of conventional admixtures such as cement and fly ash, but makes it possible to adjust the consistency rapidly and adequately by adding only a small amount of water-absorbing polymeric material or thickening agent.

DESCRIPTION OF THE PREFERRED EMBODIMENTS

The invention will be described in more detail with reference to the following examples.

EXAMPLE 1

Ready-mixed concrete having a slump value of 8 cm was prepared at a concrete plant according to the mix proportion as shown in Table 1.

TABLE 1

| Maximum size (mm) | Water/cement ratio (%) | Unit volume of coarse aggregate | Mix Proportion Quantity per unit volume (kg/m$^3$) | | | | |
|---|---|---|---|---|---|---|---|
| | | | Water | Cement | Coarse aggregate | Fine aggregate | Water reducer | AE agent |
| 20 | 50 | 0.68 | 175 | 350 | 1024 | 739 | 0.875 | 0.07 |

The ready-mixed concrete was brought into the site by an agitator truck and then remixed. During remixing, a water-absorbing polymeric material ("IM-5000" made by Sanyo Chemical Industries, Ltd., or "Glass Power" made by Kurita Kogyo Co., Ltd.) was added. After mixing, the concrete mix was tested for slump and air content at certain time intervals. The results are shown in Table 2.

TABLE 2

| | | | Change with Time in Consistency | | | | | |
|---|---|---|---|---|---|---|---|---|
| Kind of admixture | Name of admixture | Amount of admixture (kg/cm$^3$) | Slump (cm) | | | Air content (%) | | |
| | | | 0 min. | 5 min. | 15 min. | 0 min. | 5 min. | 15 min. |
| | Base concrete | | 8.0 | | 6.5 | 5.2 | | 4.6 |
| Water absorbing agent | IM-5000 | 2.0 | 3.0 | 3.0 | 2.5 | | | 3.7 |
| | | 1.0 | 5.5 | 5.0 | 4.0 | | | 3.8 |
| | Glass Power | 2.0 | 1.0 | | | | | |
| | | 1.0 | 3.0 | 2.5 | 2.0 | | | 3.7 |

The concrete mix incorporated with the water-absorbing agent was found, after hardening, to have slightly increased in strength as compared with the control, as shown in Table 3. The concrete mix having a slump value lower than 3 cm can be used for slip form construction which does not need the fixing of framework.

TABLE 3

| | | Compressive Strength | |
|---|---|---|---|
| Kind of admixture | Name of admixture | Amount of admixture (kg/m$^3$) | Compressive strength (kg/m$^3$) |
| | Base concrete | | 325 |
| Water-absorbing agent | IM-5000 | 2.0 | 349 |
| | Glass power | 2.0 | 348 |

EXAMPLE 2

Ready-mixed concrete having a slump value of 8 cm was prepared at a concrete plant in the same manner as in Example 1, according to the mix proportion as shown in Table 4.

TABLE 4

| Maximum size (mm) | Water/cement ratio (%) | Unit volume of coarse aggregate | Mix Proportion Quantity per unit volumen (kg/m$^3$) | | | | |
|---|---|---|---|---|---|---|---|
| | | | Water | Cement | Coarse aggregate | Fine aggregate | Water reducer | AE agent |
| 20 | 50 | 0.68 | 175 | 350 | 1024 | 739 | 0.875 | 0.07 |

The ready-mixed concrete was brought into the site by an agitator truck and then remixed. During remixing, a thickening agent of carboxymethylcellulose ("Sandlock" made by Sanyo Chemical Industries, Ltd., or "P-502" made by Mitsui Saiamitto Co., Ltd.) was added. After mixing, the concrete mix was tested for slump and air content at certain time intervals. The results are shown in Table 5.

TABLE 5

| | | | Change with Time in Consistency | | | | | |
|---|---|---|---|---|---|---|---|---|
| Kind of admixture | Name of admixture | Amount of admixture (kg/cm$^3$) | Slump (cm) | | | Air content (%) | | |
| | | | 0 min. | 5 min. | 15 min. | 0 min. | 5 min. | 15 min. |
| | Base concrete | | 8.0 | | 6.5 | 5.2 | | 4.6 |
| Thickening agent | Sandlock | 0.2 | 0.5 | | | | | |
| | | 0.1 | 2.0 | 1.0 | | | | |
| | P-502 | 1.0 | 5.0 | 5.0 | 5.0 | 4.6 | | 2.8 |
| | | 0.5 | 5.5 | | 4.0 | | | |

The concrete mix incorporated with the thickening agent was found, after hardening, to have slightly increased in strength as compared with the control, as shown in Table 6. The concrete mix having a slump value lower than 3 cm can be used for slip form construction which does not need the fixing of framework.

TABLE 6

| Kind of admixture | Name of admixture | Compressive Strength | |
|---|---|---|---|
| | | Amount of admixture (kg/m$^3$) | Compressive strength (kg/m$^3$) |
| Base concrete | | | 325 |
| Thickening agent | Sandlock | 0.1 | 329 |

EFFECT OF THE INVENTION

As mentioned above, Example 1 demonstrated the following effects when the consistency of ready-mixed concrete is adjusted by incorporation with a water-absorbing polymeric material having a very high water absorbing capacity which rapidly absorbs water in ready-mixed concrete and firmly retains the absorbed water.

(1) The adjustment of consistency is possible with a very small amount of water absorbing polymeric material. A desired value of consistency can be selected at any time measured by minute.

(2) The water-absorbing polymeric material, which is in the form of powder or granule, is easy to handle. It can be added to the ready-mixed concrete brought into the site by an agitator truck. This makes it unnecessary to construct a separate concrete plant for slip form construction but permits the use of an existing concrete plant.

(3) The concrete mix with its consistency adjusted by the method of the present invention can be readily applied to slip form construction which obviates the necessity of providing and removing forms.

(4) The water-absorbing polymeric material has no adverse effect on the quality of concrete after curing and hardening.

Example 2 produced the same effects as above, in which the consistency of ready-mixed concrete was adjusted by adding a thickening agent comprising carboxymethylcellulose which readily dissolves in water to give a viscous solution which exhibits adhesive properties. (Refer to Table 6, Compressive Strength.)

What is claimed is:

1. A method for adjusting the consistency of previously-mixed concrete having a slump value of 8 cm which comprises adding water-absorbing polymeric materials comprising one of a copolymer of acrylic acid with vinyl alcohol, and a polymer of sodium acrylate to the previously-mixed concrete in a ratio of 1–2 kg water-absorbing polymeric material per m$^3$ of said previously-mixed concrete to adjust the consistency of said previously-mixed concrete to a slump value of lower than 3 cm before hardening.

2. A method for adjusting the consistency of previously-mixed concrete having a slump value of 8 cm which comprises adding a thickening agent of carboxymethylcellulose to the previously-mixed concrete in a ratio of 0.1–0.2 kg thickening agent per m$^3$ of said previously-mixed concrete to adjust the consistency of said previously-mixed concrete to a slump value of lower than 3 cm before hardening.

* * * * *